May 18, 1926.
G. HORNECKER
1,584,940
ADVERTISING DEVICE
Filed Oct. 3. 1924
3 Sheets-Sheet 2
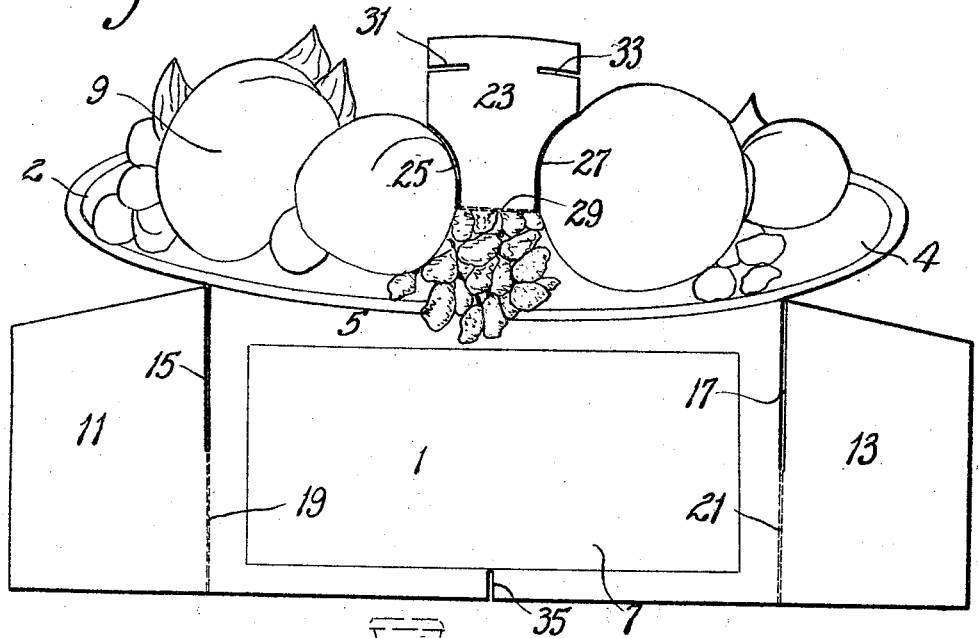
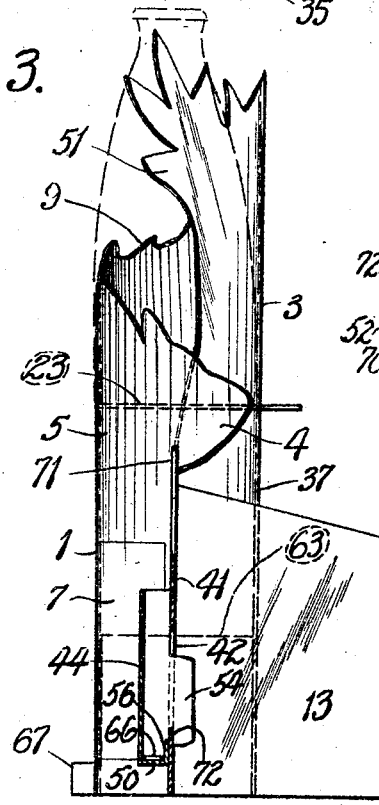
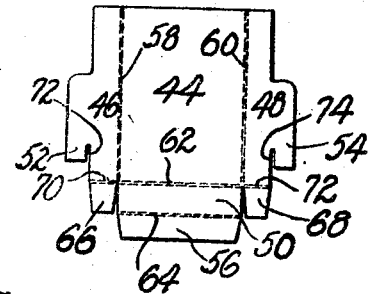
George Hornecker,
Inventor,
Delos G. Haynes,
Attorney

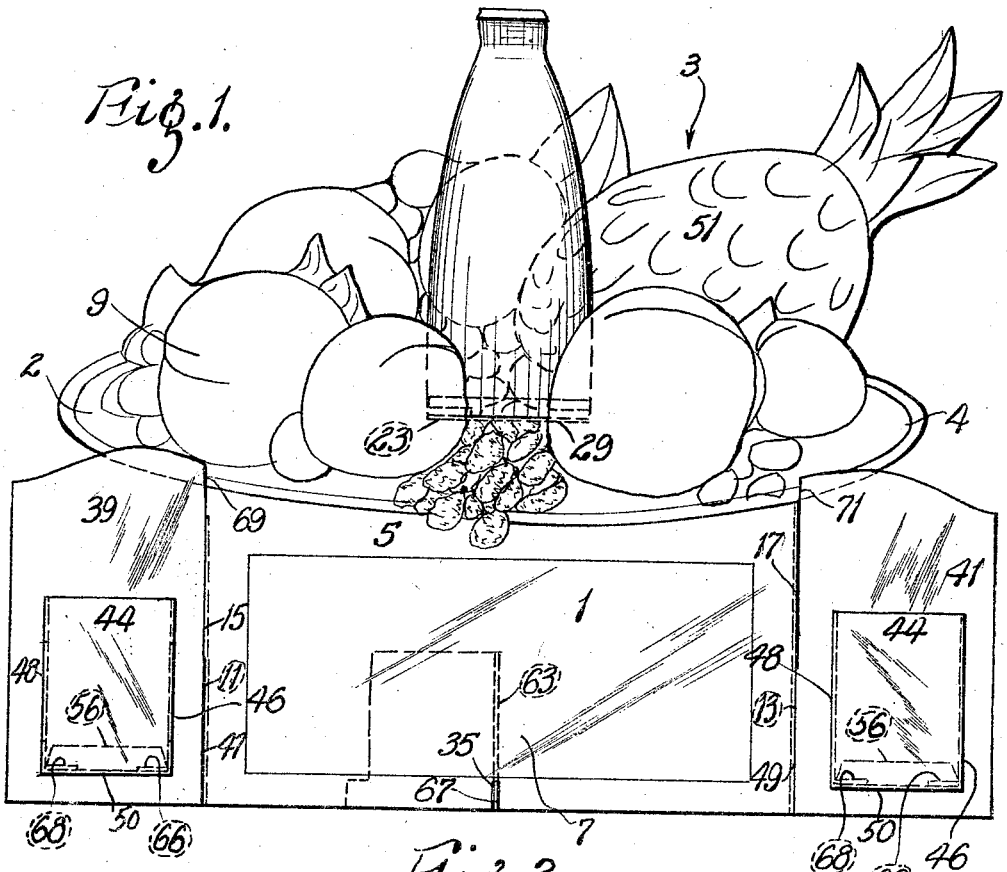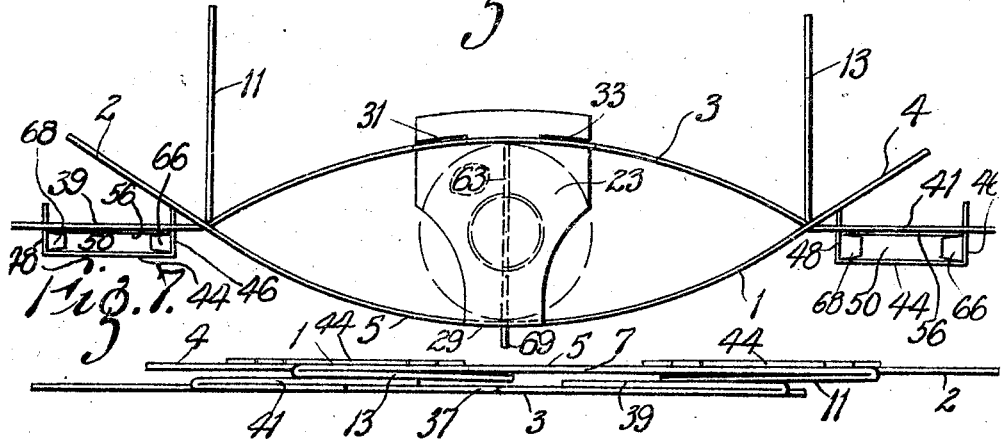

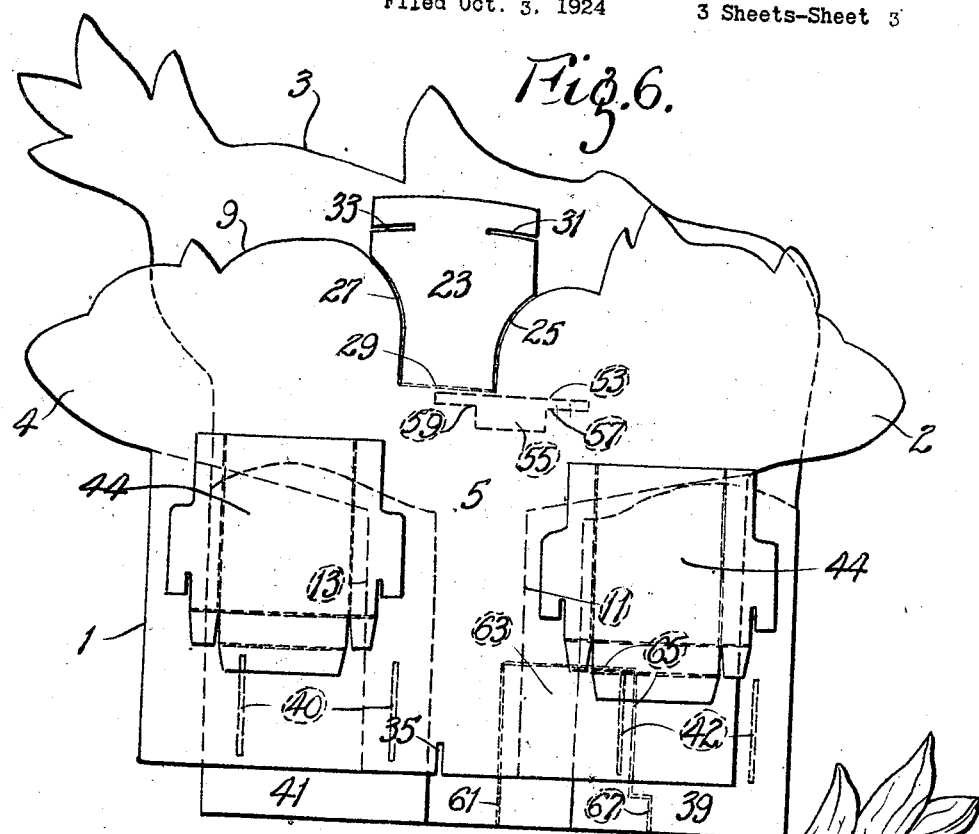
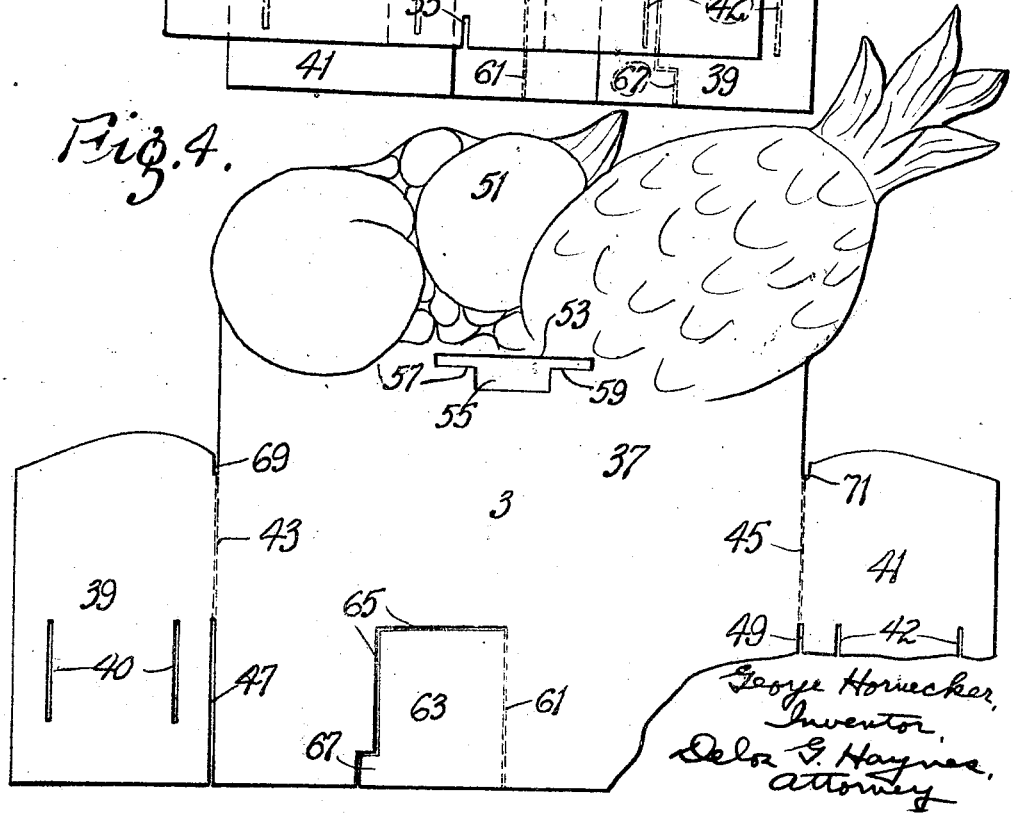

Patented May 18, 1926.

1,584,940

UNITED STATES PATENT OFFICE.

GEORGE HORNECKER, OF ELMHURST, NEW YORK, ASSIGNOR TO L. R. CONWELL, OF NEW YORK, N. Y.

ADVERTISING DEVICE.

Application filed October 3, 1924. Serial No. 741,305.

This invention relates to advertising devices, and with regard to certain more specific features, to a striking perspective representation of objects, said representation surrounding an object on display; and a display support for the whole.

Among the several objects of the invention may be noted the provision of a simple and inexpensive device for effectively supporting and displaying an object; pockets on the sides for conveniently holding literature pertaining to the object supported by the device; the provision for surrounding the object with illustrations or representations and the like, of objects which may pertain to the object on display; and the provision of a strikingly attractive device of this type which can be easily made from two blanks exclusive of the two small blanks for the pockets and shipped flat. Other objects will be in part obvious and in part pointed out hereinafter.

The invention accordingly comprises the features of construction, combination of elements and arrangements of parts, which are exemplified in the description hereinafter in connection with the accompanying drawings, and the scope of the application of which will be indicated in the following claims.

In the accompanying drawings, in which is illustrated one of various possible embodiments of the invention, Fig. 1 is a front elevation of the assembled device showing a bottle on display and pockets in position;

Fig. 2 is a top plan of the assembled device, the bottle shown in dash lines;

Fig. 3 is a side elevation of the assembled device, the pocket and part of the supporting blank being shown in section, the bottle shown in dash lines;

Fig. 4 is a flat plan view of one of the supports containing the slots for the pockets;

Fig. 5 is a flat plan view of another support;

Fig. 6 is a flat plan view of the device folded for shipping, the pockets laid out flat;

Fig. 7 is a bottom end view of the device folded prior to shipping; and

Fig. 8 is a flat plan view of one of the pockets.

Similar reference characters indicate corresponding parts throughout the several views of the drawings.

Referring now more particularly to Figs. 1 to 5 of the accompanying drawings there is illustrated at 1 a forwardly disposed support and at 3 a rearwardly disposed support, each adapted to interlock with the other in a manner to be described.

The forward support 1, illustrated separately in Fig. 5, comprises a single sheet of suitable material such as patent coated manila which may take a variety of forms and/or outlines.

The salient constructional features of the support 1, however, are the central panel 5 which may carry legends and/or illustrations on the lower portion 7 thereof and an illustration, legend or ornamental design 9 at the top thereof. Both upper and lower illustration and/or legends may be printed, lithographed or otherwise formed, but the upper one is to be partially outlined by means of the die cutting or such process as may be used in cutting the supports 1 and 3. In the present embodiment the upper illustration represents a portion of a bowl of fruit.

At each side of the central panel 5 are formed the wings 11 and 13 separated from said central panel, in part by the downwardly extending incisions 15 and 17, and in part by the scorings 19 and 21. The wings swing on the central panel by means of said scorings. The incisions cooperate with incisions in the rearward support 3 to be described.

At the top of the central panel 5 is formed the tongue 23 which is relieved from the upper illustration 9 by incisions 25 and 27 adapted to follow the outline of said upper illustration. This tongue 23 is hinged to the central panel at a point below the upper extreme thereof by means of the horizontal score line 29 and is adapted to be hinged rearwardly at an angle of substantially ninety degrees. The tongue is also provided with sideward curved incisions 31 and 33 for cooperation with the aforementioned rearward support. The curvature given to these incisions is governed by the curvature of the rearward support, which will be described.

Centrally and at the bottom of the central panel is cut a short vertical incision 35, to be cooperated with by a tongue on the said rearward support 3.

The rearward support (Fig. 4), also comprises a single sheet of the same material as is used for the forward support. Likewise only two operations are required in making it, namely, die-cutting and lithographing or the equivalent.

Like the forward support the rearward support comprises a central panel 37, side wings 39 and 41, hinged thereto by means of scorings 43 and 45, and relieved therefrom by incisions 47 and 49. At the top of this central rearward panel 37 is provided the illustration 51 partially outlined by part of the edge of the panel 5. This illustration is the complement of the one on the forward support and with it is intended to complete an illusion of an object; a bowl of fruit in this case.

Near the lower limit of the upper illustration 51 is provided the lateral slot 53 of horizontal length equal to the width of the tongue 23 on the forward support 1, and the downwardly extending portion 55 thereof. Thus are left the solid portions 57 and 59 adapted to cooperate with the incisions 31 and 33 of the tongue 23 (Fig. 2) after said tongue has been turned substantially at right angles and slipped into the slot 53.

This tongue 23 when in its assembled horizontal position directly supports the displayed object; a bottle as illustrated here. The side wings 39 and 41 contain two pairs of parallel incisions, to wit, slots 40 and 42 for supporting the blanks which are folded into shape and attached as hereinafter described.

No legends are required on the lower portion of the panel 37, but centrally thereon is provided the vertical score line 61 upon which the tongue 63 hinges. The tongue 63 is relieved from the main area 37 by means of the cut 65 and by means of this same cut is provided with a small projection 67, adapted to cooperate with the central vertical incision 35 of the forward support 1 when the tongue 63 is bent at right angles forwardly.

To further facilitate interlocking between the supports, the rearward support 3 is provided between the central panel and the side wings, with the vertical incisions 69 and 71 in line with the score lines 43 and 45. Their use will be apparent when the assembly is described.

Only die-cutting and lithographing or the equivalent are needed to complete the manufacture of this rearward support.

The pockets are formed of die cut blanks in the shape shown in Fig. 8 wherein the pocket blank 44 has surrounding its three sides, marginal portions 46, 48, and 50. The parallel side marginal portions 46, 48 separated from the main blank 44 by score lines 58, 60, have extending from them ears 52, 54 and flaps 66, 68 at their lower edges separated by score lines 70, 72. The bottom marginal portion 50 separated from the body of the blank 44 by score line 62 has a flap separated from it by the scored line 64.

To assemble the device the forward and rearward supports are first interlocked by making incisions 15, 17 (Fig. 5), in the forward support, cooperate with incisions 47, 49 respectively (Fig. 4) in the rearward support. These incisions are long enough that the forward support may be raised enough with respect to the rearward one that the sidewardly overhanging portions 2 and 4 of the upward illustration 9 may pass over the curved upper portions of wings 39 and 41 of the rearward support and then drop into the short incisions 69 and 71 of the rearward support 3. After this has been done the lower edges of the two supports are flush and the wing of the rearward support are forward of the wings of the forward support, (Figs. 1, 2 and 3).

The vertical tongue 63 of the rearward support is now bent forwardly and the portion 67 thereof made to cooperate with the short central vertical incision 35 of the forward support. This tongue acts as a compression member between the supports to centrally bow them away from one another. They are held together toward their ends by the previously mentioned interlocking incisions. It is this curvature or bow for which the curvature of the incisions 31, 33 of tongue 23 is provided.

The pockets are assembled and attached to the device as follows:

The bottom marginal flap 56 and marginal portion 50 are bent rearwardly, the portion 50 at a right angle to the body portion 44 and the flap 56 at a right angle to it on their corresponding score lines 62, 64. The flaps 66, 68 on the lower edges of 46, 48 are bent backward at right angles on their score lines 70, 72 to the portion 46 and 48. The side marginal portion, 46, 48 are now bent rearwardly on their score lines 58, 60 to assume a position at right angles to the body portion 44. The flaps 66, 68 are laid on top of the portion 50 which acts as a bottom to the pocket. The pockets are now attached to the side wings 39, 41 by inserting the ears 52 and 54 in slots 40, 40 and 42, 42. Short incisions 72, 74 in ears 52, 54 will interlock with the bottom of the slots 40, 42 and hold the pocket as assembled firmly in shape and in place on the wings of the device.

The device is now stable when set on the lower edges of the support. The wings 11 and 13 of the forward support may now be rearwardly bent and form braces to make the whole more stable. The wings 39 and 41 of the rearward support due to the interlocking action of the incision 69, 71 take up a position substantially in line with one another extending sidewardly. They may however, by straining the material, be made to stand at an angle to one another. These wings effectively increase the display area of the central panel 7.

To complete the assembly it only remains to turn the tongue 23 down rearwardly causing it to enter the slot 53. The incisions 31, 33 are then free to cooperate with the portions 57, 59 of the rearward support. Since the lower edge of the opening 55 is on a level with the score 29 the tongue 23 becomes horizontally disposed and is thereby adapted to support an object, such as the bottle shown herein.

The position of the tongue down in and between the objects of the illustration causes the bottle or object standing thereon to appear surrounded by the objects and at the same time said bottle is effectively braced by the cardboard or other material, should it tend to tip over. The actual perspective of the real object or bottle and the artificial perspective of the surrounding objects or fruit blend pleasingly. It is well to have the illustration surrounding the object on display, of such a nature as to draw attention to said object.

The advantage of the interlocking system described, lies in the fact that the assembled device with the bottle in place may be picked up by means of either support without danger of its coming apart. This is readily discernible (Fig. 1) when it is noted that when grasped by the rearward support the extending portion 67 of tongue 63 in the incision 35 holds up the forward support. Also, when grasped by the forward support 1 the portions below the incisions 15 and 17 hold up the rearward support 3, (Figs. 1, 4 and 5).

Furthermore, a rigid device is obtained after assembly because of the combined actions of the vertically disposed bracing tongue 63 and the horizontally disposed tongue 23, the latter acting horizontally both as a support, and as a tension or compression brace as the case may require. Thus the device is relatively stiff in all planes.

It will be seen that no extraneous supports are required and no gluing or expensive folding is required either in manufacture or installation of the article.

A preferred arrangement for shipping is shown in Figs. 6 and 7 wherein the rearward support 3 is laid on its face with its wings bent back and laid flat. On this, as shown in Fig. 6, is laid the forward support 1 with its wings laid flat forward and on top of this is laid the two flat pocket blanks 44. This makes a neat thin package with wings folded inwardly and may be readily wrapped and shipped. The material always tends to assume its flat characteristic when disassembled.

From the above it will be seen that the several objects of the invention are attained and other advantageous results achieved.

As many modifications of the embodiments above illustrated might be made without departing from the spirit or scope of the present invention, it is intended that the above description and accompanying drawings and claims shall be interpreted as illustrative and not in a limiting sense.

I claim:

1. An advertising device comprising two vertical supports, illustrations formed at the tops of said supports, panels formed centrally thereof and wings formed sidewardly thereof, a plurality of interlocking incisions between said wings and said panels adapted to lock said supports together, a brace between said supports for bowing them from one another and a horizontal tongue extending between them adapted to hold an object.

2. An advertising device comprising a forward support, a rearward support, a plurality of interlocking means between said supports, a vertical tongue hinged to the rearward support interlocking with the forward support adapted to bow one support from the other, and a horizontal tongue between said supports adapted to hold an object.

3. An advertising device comprising a forward support, a rearward support, a plurality of interlocking means between said supports, a vertical tongue hinged to the rearward support interlocking with the forward support adapted to bow one support from the other and a horizontal tongue hinged to the forward support and interlocking with the rearward support and adapted to hold an object.

4. An advertising device comprising a forward support, a rearward support and illustrations formed at the tops of said supports, a plurality of interlocking means between said supports, a vertical tongue hinged to the rearward support interlocking with the forward support adapted to bow one support from the other and a horizontal tongue between said supports adapted to hold an object between said illustrations.

5. An advertising device comprising a forward support, a rearward support and illustrations formed at the top of said supports, a plurality of interlocking means between said supports, a vertical tongue hinged to the rearward support interlocking with the forward support adapted to bow one support from the other and a horizontal tongue hinged to the forward support and interlocking with the rearward support adapted to hold an object between said illustrations.

6. An advertising device comprising two vertical supports, illustrations formed at the tops of said supports, panels formed centrally thereof and wings formed sidewardly thereof, a plurality of interlocking incisions between said wings and said panels adapted to lock said supports together, a vertical brace hinged to the rearward support and interlocking with the forward one for bowing them apart, a horizontal tongue hinged to the forward support and interlocking with the rearward support below said illustrations for the purpose of holding an object between said illustrations, and pockets secured to the wings.

7. An advertising device comprising two vertical supports, illustrations formed at the top of said supports, panels formed centrally thereof and wings formed sidewardly thereof, a plurality of interlocking incisions between said wings, pockets adapted to be held by said wings and said panels adapted to lock said supports together.

In testimony whereof, I have signed my name to this specification this 27th day of September, 1924.

GEORGE HORNECKER.